(12) United States Patent
Norris

(10) Patent No.: US 9,816,862 B2
(45) Date of Patent: Nov. 14, 2017

(54) SYSTEMS AND METHODS FOR TEXTURE ANALYSIS OF A COATED SURFACE USING MULTI-DIMENSIONAL GEOMETRIES

(71) Applicant: PPG Industries Ohio, Inc., Cleveland, OH (US)

(72) Inventor: Alison M. Norris, Avon, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 193 days.

(21) Appl. No.: 13/803,016

(22) Filed: Mar. 14, 2013

(65) Prior Publication Data

US 2014/0267227 A1 Sep. 18, 2014

(51) Int. Cl.
*G06T 15/00* (2011.01)
*G01J 3/50* (2006.01)
*G01J 3/46* (2006.01)

(52) U.S. Cl.
CPC .............. *G01J 3/504* (2013.01); *G01J 3/463* (2013.01)

(58) Field of Classification Search
CPC .................................................... G06T 15/00
See application file for complete search history.

(56) References Cited

U.S. PATENT DOCUMENTS

| 3,916,168 A | 10/1975 | McCarty et al. |
| 6,256,093 B1 * | 7/2001 | Ravid ................ G01N 21/9501 356/237.2 |
| 2002/0122033 A1 * | 9/2002 | Rupieper et al. ............. 345/419 |
| 2004/0252308 A1 * | 12/2004 | Prakash et al. ................ 356/445 |
| 2006/0245632 A1 | 11/2006 | Nisper et al. |
| 2008/0291449 A1 | 11/2008 | Rodrigues et al. |
| 2009/0147265 A1 * | 6/2009 | Klaver ..................... G01D 5/38 356/488 |
| 2010/0094601 A1 | 4/2010 | Steenhoek |
| 2011/0250351 A1 * | 10/2011 | Steenhoek .............. G06F 15/00 427/140 |
| 2013/0016339 A1 * | 1/2013 | Edwards ................ G01N 21/25 356/51 |

* cited by examiner

*Primary Examiner* — Sing-Wai Wu
(74) *Attorney, Agent, or Firm* — Michael D. Lazzara

(57) ABSTRACT

A computer implemented method. The method includes generating, using a processor, a multi-dimensional object from a plurality of data obtained from a spectrophotometric measurement of a target coating. The method also includes calculating, using the processor, at least one geometric property of the multi-dimensional object. The method further includes correlating, using the processor, the at least one value with a plurality of known values to identify at least one pigment effect in the target coating, and outputting, using the processor, the at least one pigment effect.

17 Claims, 6 Drawing Sheets

SYSTEMS AND METHODS FOR TEXTURE ANALYSIS OF A COATED SURFACE USING MULTI-DIMENSIONAL GEOMETRIES

FIELD OF THE INVENTION

In various embodiments, the present invention generally relates to the use of multi-dimensional geometrical solids and surfaces/planes to relate a plurality of spectral reflectances from a plurality of spectrophotometric angles and/or incident light sources, or combinations thereof, to identify the proper pigment(s) to match both the texture and/or gonioapparent effect(s) occurring within an unknown target coating.

BACKGROUND OF THE INVENTION

In a standard portable spectrophotometer, the incident light is generally, but not always, set at an angle of forty-five (45) degrees from normal. The resulting spectral reflectances that can be gathered are generally in the same plane as the incident light and are on either side of the specular angle (the equal and opposite angle to the incident light) as well as nearer to the incident light source itself.

New portable spectrophotometric devices offer a vast multitude of angular color response (spectral reflectance) data. Besides the addition of several new angles, including azimuthal, or out-of-plane angles, many instruments also offer additional light sources with different geometries. By way of example, the incident light source of a second illuminator may be located at fifteen (15) degrees from normal. The plurality of combinations of incident light and angular response can provide both too little information and too much information regarding the target coating.

Thus, there is a need for systems and methods that can be used to evaluate all of the data, including specific combinations of data, obtained from a spectrophotometer by using multi-dimensional geometrical evaluation and calculations.

SUMMARY OF THE INVENTION

In a first aspect, embodiments of the invention provide a computer implemented method. The method includes generating, using a processor, a multi-dimensional object from a plurality of data obtained from a spectrophotometric measurement of a target coating. The method also includes calculating, using the processor, at least one geometric property of the multi-dimensional object. The method further includes correlating, using the processor, the at least one value with a plurality of known values to identify at least one pigment effect in the target coating, and outputting, using the processor, the at least one pigment effect.

In another aspect, embodiments of the invention are directed to a system. The system includes a database, and a processor in communication with the database. The processor is programmed to generate a multi-dimensional object from a plurality of data obtained from a spectrophotometric measurement of a target coating, and calculate at least one geometric property of the multi-dimensional object. The processor is also programmed to correlate the at least one value with a plurality of known values to identify at least one pigment effect in the target coating, and output the at least one pigment effect.

In another aspect, embodiments of the invention provide an apparatus. The apparatus includes means for generating a multi-dimensional object from a plurality of data obtained from a spectrophotometric measurement of a target coating, and means for calculating at least one geometric property of the multi-dimensional object. The apparatus also includes means for correlating the at least one value with a plurality of known values to identify at least one pigment effect in the target coating, and means for outputting the at least one pigment effect.

In a further aspect, embodiments of the invention provide a non-transitory computer readable medium including software for causing a processor to:

generate a multi-dimensional object from a plurality of data obtained from a spectrophotometric measurement of a target coating;

calculate at least one geometric property of the multi-dimensional object;

correlate the at least one value with a plurality of known values to identify at least one pigment effect in the target coating; and output the at least one pigment effect.

DETAILED DESCRIPTION OF THE INVENTION

Figure 1:
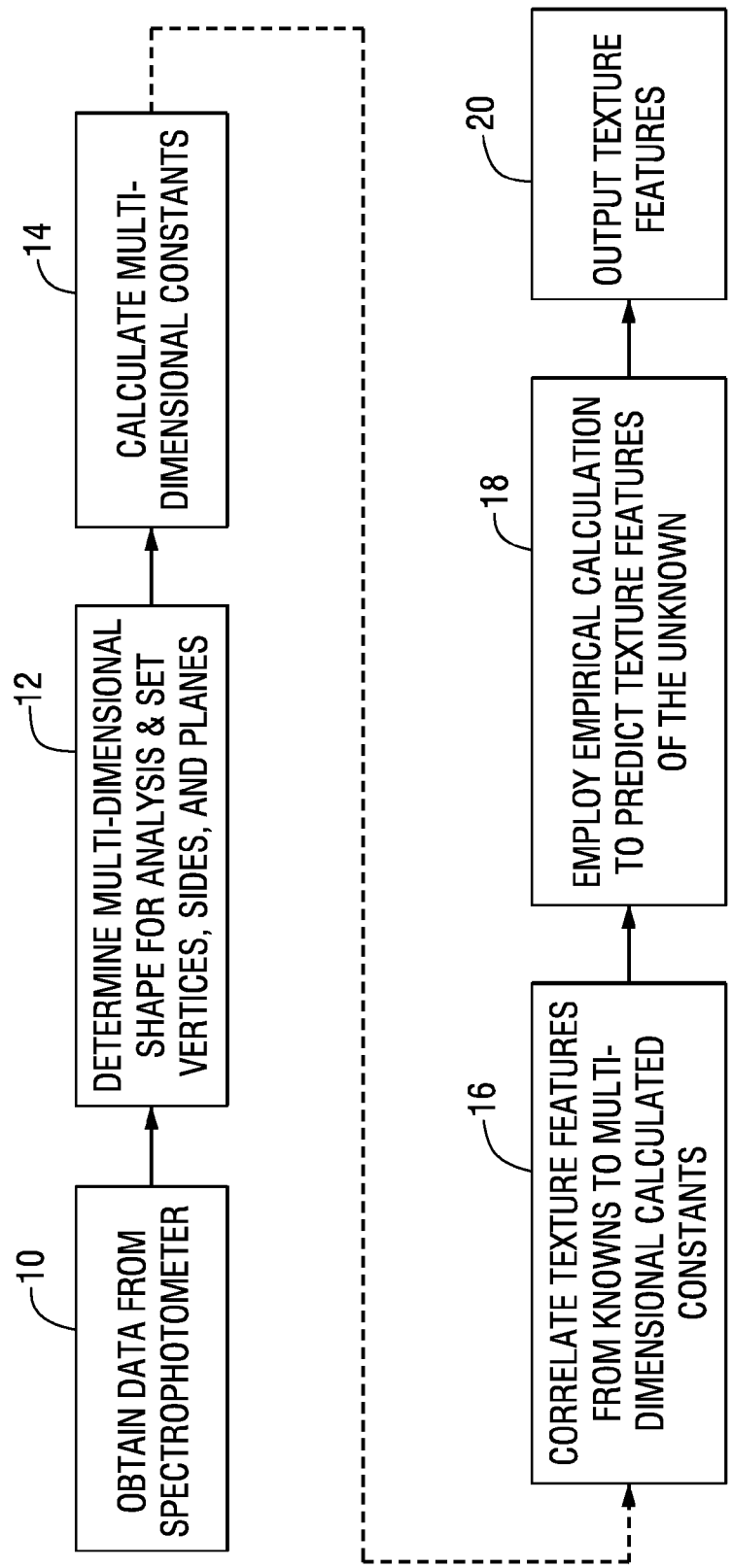
FIG. 1 illustrates a process for analyzing a target surface coated with a target coating according to various embodiments of the invention.

In various embodiments, the present invention generally relates to systems and methods for identifying physical property attributes of cured complex coating (e.g., paint) mixtures using multi-dimensional geometrical data that is calculated based on the spectral reflectance and colorimetric response from a spectrophotometer. Although the description herein is directed to two- and three-dimensional objects, it can be understood that objects of any dimension (e.g., four-dimensional) are contemplated by embodiments of the present invention.

While the description herein generally refers to paint, it should be understood that the devices, systems and methods apply to other types of coatings, including stain and industrial coatings. The described embodiments of the invention should not be considered as limiting. A method consistent with the present invention may be practiced in a variety of fields such as the matching and/or coordination of apparel and fashion products.

Embodiments of the invention may be used with or incorporated in a computer system that may be a standalone unit or include one or more remote terminals or devices in communication with a central computer via a network such as, for example, the Internet or an intranet. As such, the computer or "processor" and related components described herein may be a portion of a local computer system or a remote computer or an on-line system or combinations thereof. The database and software described herein may be stored in computer internal memory or in a non-transitory computer readable medium.

In various embodiments, multi-dimensional geometric methodology has various purposes. In order to use all available angles within a given system, multi-dimensional geometries may be used to create an alternate bi-directional reflectance distribution function ("BRDF")-type analysis. This type of analysis does not exclude any angles, but instead uses all angles to create a hemispherical "map" or "fingerprint" of a particular texture or pigment type, whether gonioapparent or not. The appropriate "map" shape and features, such as side length, internal angles, etc., may be used as a comparison tool to identify, thus fingerprint, specific pigments or generic pigment types. Also, multi-dimensional geometries may be used to evaluate only specific combinations of angles in order to achieve purposeful manipulations. In various embodiments, this includes the specific exclusion of specific singular angles or combinations of angles. Such a methodology may be used when a particular texture or effect is being sought after as being included or not included in a target coating. Also, multi-dimensional geometries may be used to accommodate and correct the potential assumption that received spectral reflectance values are incorrect in some way. Exemplary reasons for irregularity or abnormality of spectral reflectance data, even if minor in nature, include incident light ankle location, incident light fluctuation, aperture size, target coating surface non-uniformity, etc.

FIG. 1 illustrates a process for analyzing a target surface coated with a target coating according to various embodiments of the invention. At step 10, data relating to readings of the target surface are obtained from a spectrophotometer. At step 12, the manner in which the angles and light sources converge to create multi-dimensional objects is determined. The objects may be created using the physical angular layout of the spectrophotometer. By way of example, for a two-dimensional object two angular reflectances may be joined with a straight line on top with both reflectances converging on the point of measurement to create a triangle. Also, by way of example, for a three-dimensional object a tetrahedron may be constructed by considering the point of measurement on the target coating to be the apex of an inverted tetrahedron, where the apex lies with the coordinates (0, 0, 0). In both the two- and three-dimensional examples, the location of the other vertices of the object become coordinates that are functions of (1) a version of the angle reflected light, which may be dependent upon the incident light angle; (2) indication of in-plane or out-of-plane and the location within that plane to indicate the flare or tilt of the multi-dimensional shape; and (3) the spectral reflectance value or assigned value for the light source at a particular wavelength. While triangular and tetrahedral examples are given herein, it can be understood that any multi-dimensional object may be created because the values of the vertices and/or sides, whether straight or arced, can be mathematically calculated. When using spectral reflectance data, in various embodiments all wavelengths may be considered individually for initial analysis, and then integrated together either in part or as a whole. In various embodiments, multi-dimensional vertices or sides may be created using a variety of colorimetric information, rather than spectral reflectance data, thus eliminating the need to complete the analysis for multiple wavelengths.

Figure 2:
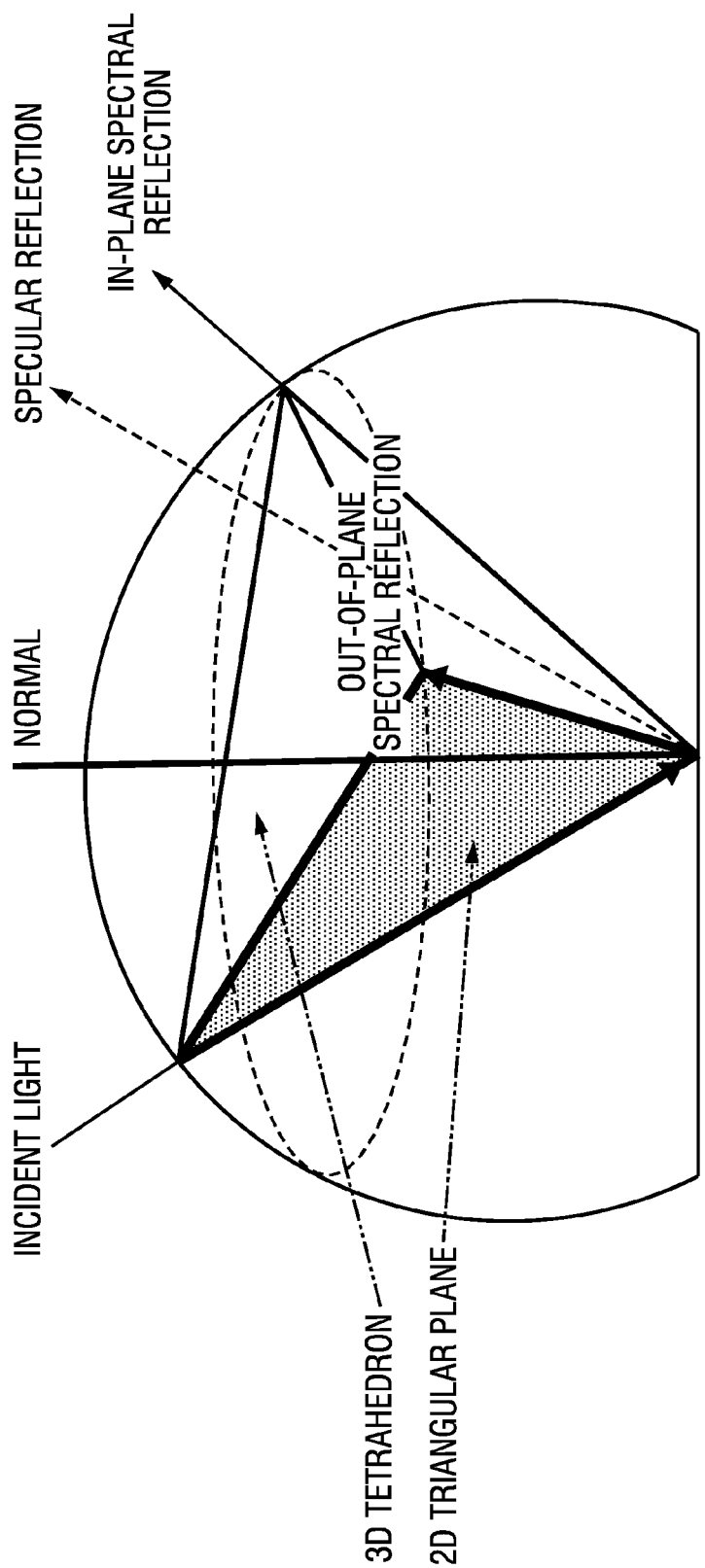
FIGS. 2 and 3 illustrate examples of multi-dimensional objects that may be created using the physical layout of a spectrophotometer.
Figure 3:
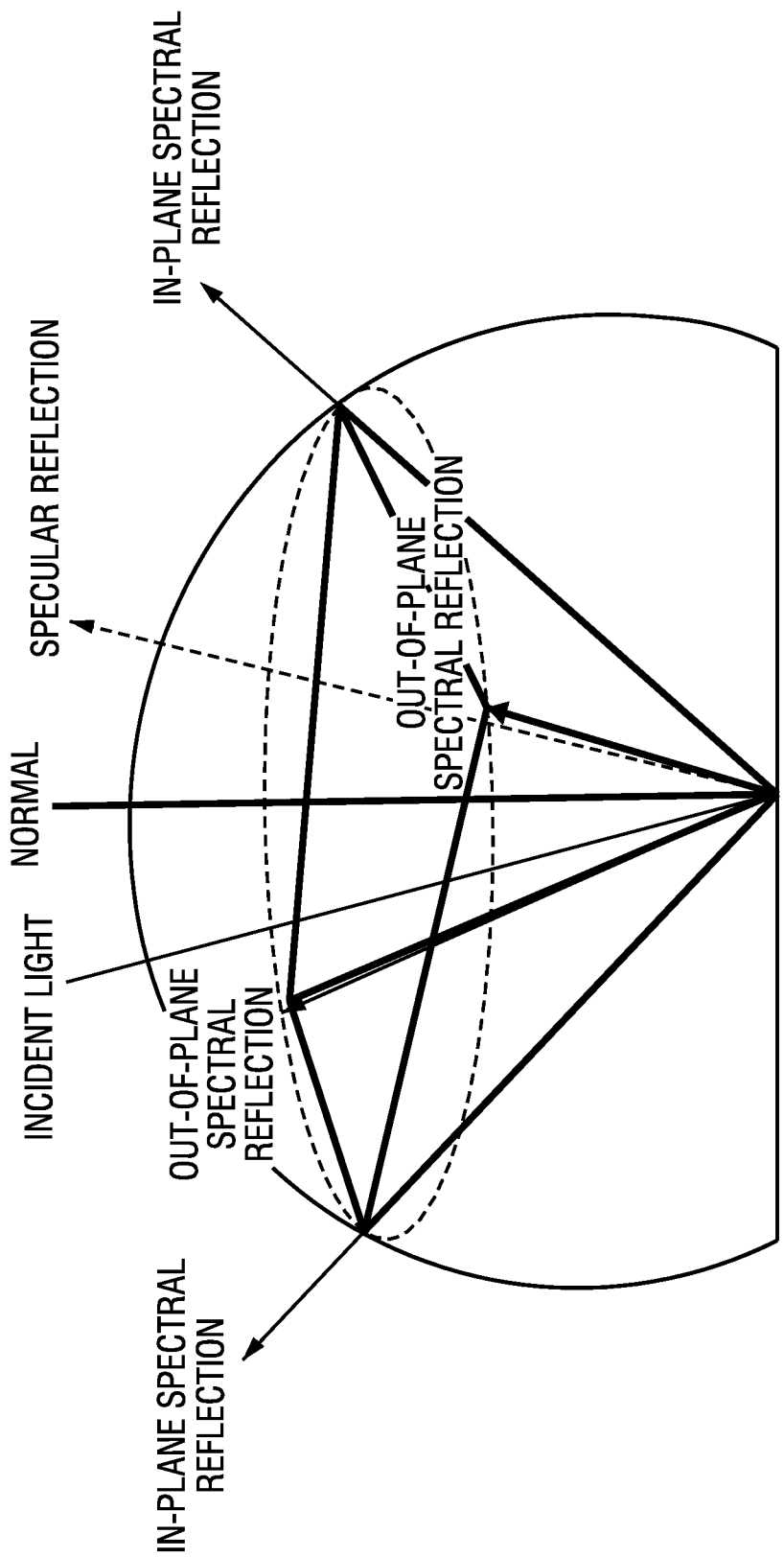

FIGS. 2 and 3 illustrate examples of multi-dimensional objects that may be created using the physical layout of a spectrophotometer.

In various embodiments one of the sides of the multi-dimensional shape may be inclusive of the incident light itself. In the case where the incident light is used as one side of the multi-dimensional shape, the coordinates may be determined as explained herein, with the exception of the spectral reflectance or colorimetric data. Because the illuminator is assumed to be calibrated properly, the correct assumption in place of spectral reflectance is 1, or 100%, as the input incident light. In the case where the incident light is not used as one side of the multi-dimensional shape, the incident light angle, either from normal or from parallel, may be used within the coordinate definitions of other angular data. This may be useful when working with data from multiple incident light angles or when including a comparison of the data received from the same physical receptor on the instrument, however the incident light came from multiple angles.

Once the multi-dimensional object has been determined, it can be used to calculate values for the newly created multi-dimensional object at step 14. By way of example, in various embodiments perimeter, area of a face/plane, total surface area, or volume may be calculated, among other geometric properties. All calculations may take the standard form used in multi-dimensional geometric calculus, substituting in the various values determined for the vertices and sides, as discussed hereinabove, and iterating for multiple wavelengths as desired. In various embodiments, the calculations may be completed for some or all combinations and permutations of incident light angle data and/or two or more pieces of spectral reflectance data/calorimetric data. This allows for the comparison of individual angular data pieces as pairs, triples, quadruples, etc., as well as comparisons and specific combination comparisons.

When using spectral reflectance data, the calculation occurs individually for each wavelength. In various embodiments, statistics, such as mean, median, and sum may be used to create a singular value out of multiple wavelength calculated multi-dimensional geometric values. In various embodiments, individual wavelengths may be compared between multi-dimensional geometric analyses. In such a situation the focus may be on the wavelength or wavelengths of maximum reflectance, and possibly secondary maximum reflectance, where a majority of color and/or texture would be visibly perceived within the visible spectrum. An analysis of shifting maximum reflectances by wavelength may also be completed using multi-dimensional geometric analysis.

In the ease of a desire to use a data point that is not physically available to be measured, simple geometric laws may be invoked to interpolate the proper values as a new vertex or side. For example, the Law of Cosines may be employed for a triangular two-dimensional plane. The calculated values, vertices, and side lengths yield data with which to create the foundation of the texture analysis, though at the risk that may be created by any form of interpolation (or extrapolation).

The calculated multi-dimensional values from the calorimetric or spectral reflectance data may be correlated, for example empirically, to known characteristics at step 16 to identify textures, primary flake types, or other appearance information in the target coating mixture. In various embodiments, to employ an empirical method the multi-dimensional geometric data points (perimeter, area, etc.) are calculated for an empirical dataset and all desired combinations of angles that are representative of the expected mixtures and colors that will need to be handled in typical situations. The empirical data set may be used at step 18 to create a predictive correlation: $y=f(x)$, where y represents the desired characteristic for identification or a qualitative question regarding the target coating, and f(x) is some function of x's, where x is one or more variables using the multi-dimensional geometric calculated values from a specific set or multiple sets of angular considerations. In various embodiments, it may be desirable to limit the angular comparison sets to those that are most feature-defining for the particular characteristic of the target coating that is being identified. The resulting function may be linear or non-linear as defined by the empirical data set.

Figure 4:
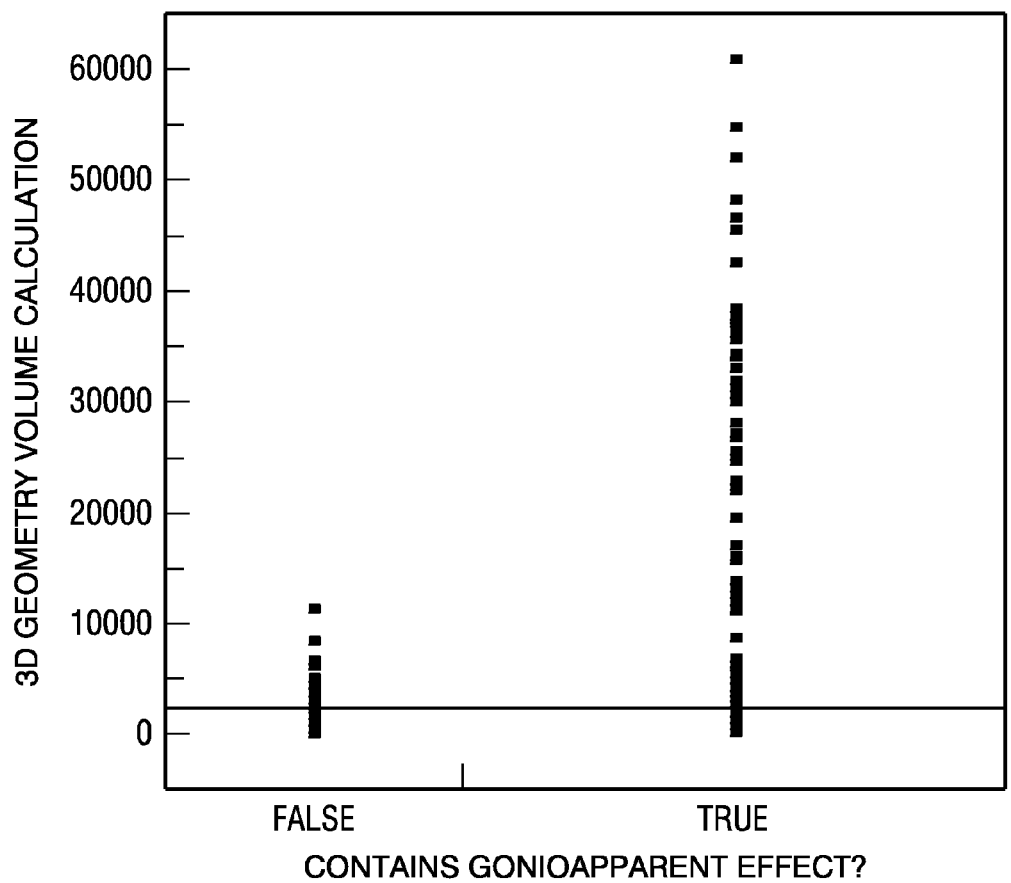
FIG. 4 is an example of the use of a three-dimensional volume calculation in a specific combination of angles to predict whether a target coating will contain a gonioapparent effect that is in question.
Figure 5B:
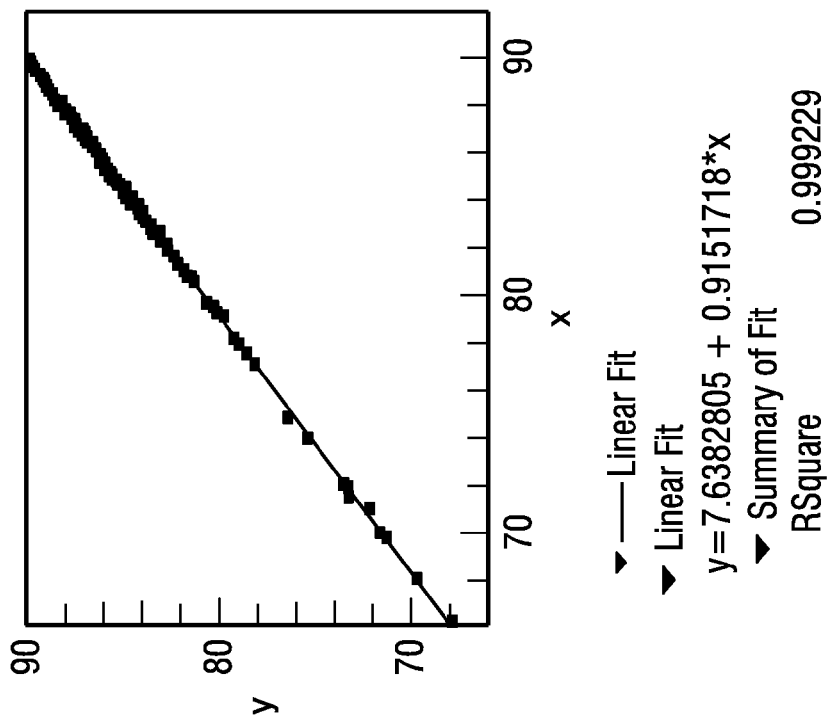
FIGS. 5a and 5b illustrate examples of the use of two-dimensional internal polygonal angle calculations at two different physical angular locations (x and y).
Figure 5A:
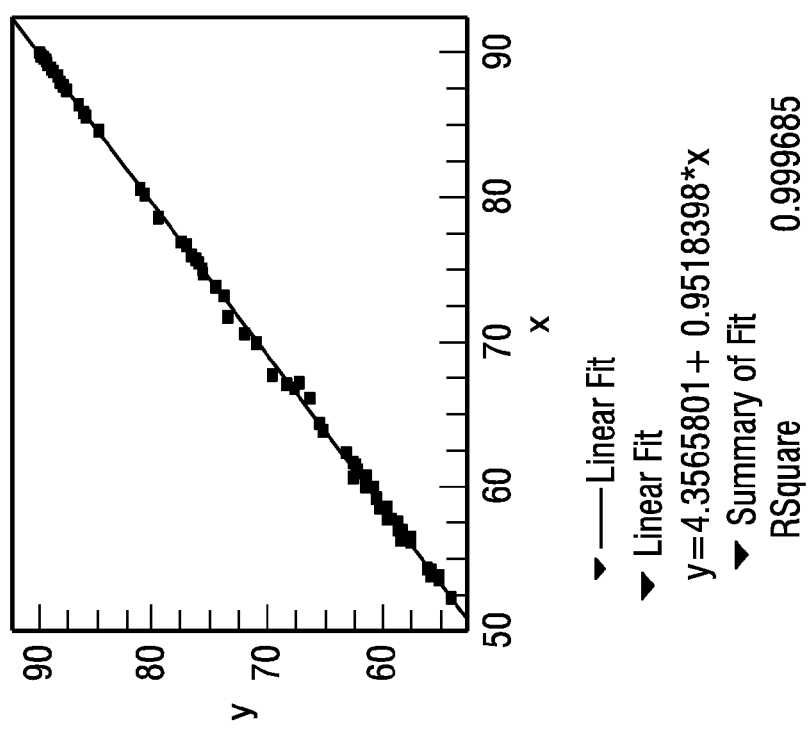

FIG. 4 is an example of the use of a three-dimensional volume calculation in a specific combination of angles to predict whether a target coating will contain a gonioapparent effect that is in question. In this case, a volume calculation with a value higher than approximately 5000 may indicate the high likelihood of containing a gonioapparent effect pigment. FIGS. 5a and 5b illustrate examples of the use of two-dimensional internal polygonal angle calculations at two different physical angular locations (x and y). FIG. 5a illustrates examples within the empirical set that are gonioapparent but do not contain any aluminum pigments and FIG. 5b illustrates examples within the empirical set that are gonioapparent and contain aluminum pigments. Though both correlations are linear, the difference in y-intercept values between the two correlations illuminates the usage, or lack thereof, of an aluminum pigment.

Once an empirical correlation has been determined, it can be used to derive the predicted value, and thus composition, of the target coating. This may be achieved by using the target coating's values for the x's (multi-dimensional perimeter, area, etc.) and calculating the answer for y (the texture effect). The features of the target coating are output at step 20. While examples have been given herein for the content of a gonioapparent pigment and/or aluminum pigment, embodiments of the systems and methods may be as specific as which gonioapparent pigment at which size flake of that pigment by iteratively choosing the most important combinations of angles for the multi-dimensional geometric calculations. In various embodiments, the empirical correlations may be improved by including other non-multi-dimensional information, such as for example singular angle colorimetric data.

The quality of the overall "map" or "fingerprint" and the quality of the empirical correlation may be dependent upon the quality of the input data. The quality of the input data may be dependent upon the quality of the instrumentation and the quality of the data set used to create a set of knowns for the overall map or the empirical correlation. While any quality of data from an instrument or empirical data set will result in an answer, the result may be improved with the use of a high quality instrument and a widely varied, high quality empirical data set.

The entire set of calculations described herein may be used to facilitate the choice of specific angle combinations and to accommodate the volume of calculations required to derive and then use an empirical correlation using multi-dimensional data.

Figure 6:
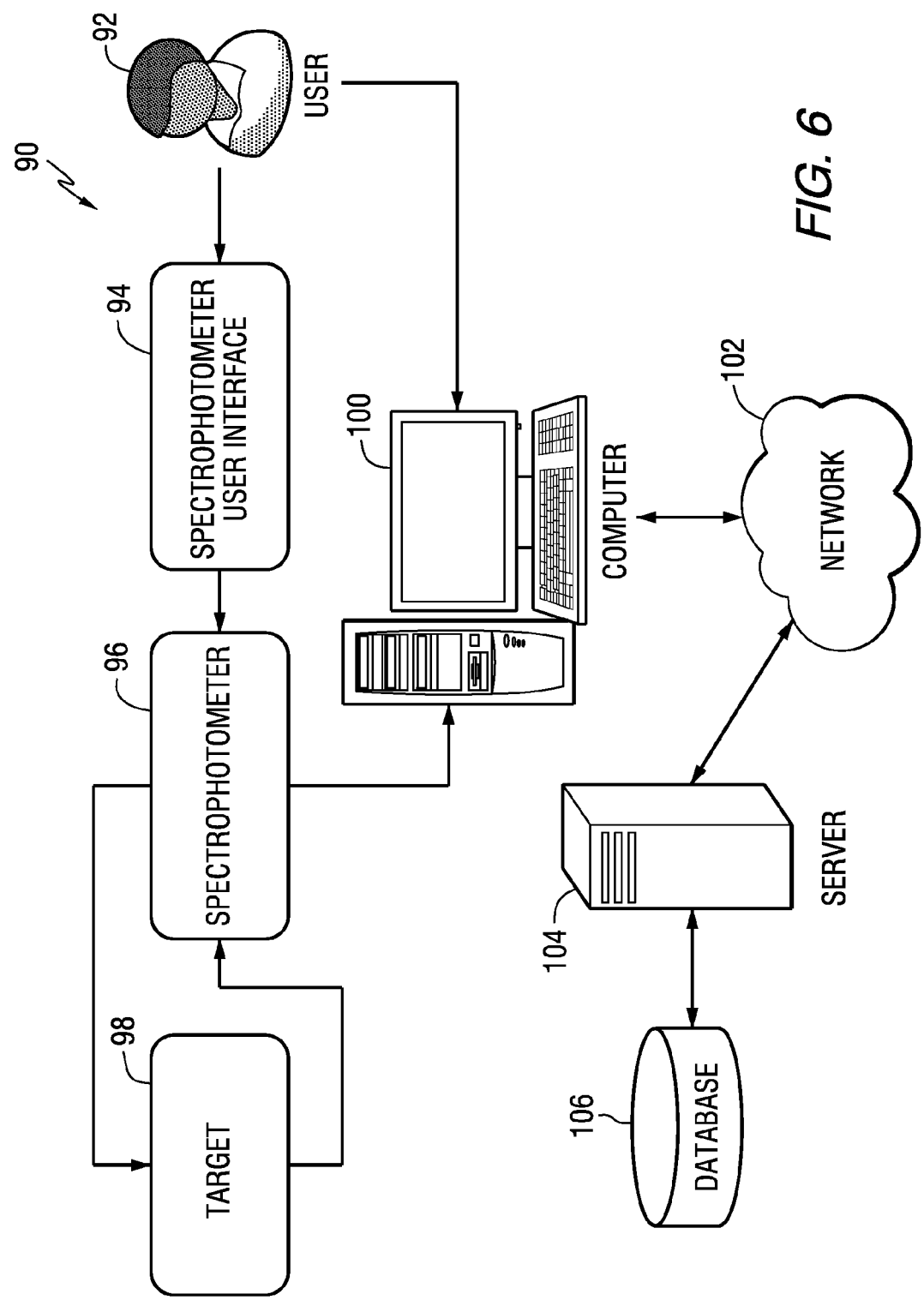
FIG. 6 illustrates an embodiment of a system 90 which may be used to identify physical property attributes of a coating mixture of a target sample.

FIG. 6 illustrates an embodiment of a system 90 which may be used to identify physical property attributes of a coating mixture of a target sample. A user 92 may utilize a user interface 94, such as a graphical user interface, to operate a spectrophotometer 96 to measure the properties of a target sample 98. The data from the spectrophotometer 96 may be transferred to a computer 100, such as a personal computer, a mobile device, or any type of processor. The computer 100 may be in communication, via a network 102, with a server 104. The network 102 may be any type of network, such as the Internet, a local area network, an intranet, or a wireless network. The server 104 is in communication with a database 106 that may store the data and information that is used and generated by the methods of embodiments of the present invention. Various steps of the methods of embodiments of the present invention may be performed by the computer 100 and/or the server 106.

In another aspect, the invention may be implemented as a non-transitory computer readable medium containing software for causing a computer or computer system to perform the method described above. The software can include various modules that are used to enable a processor and a user interface to perform the methods described herein.

It will be readily appreciated by those skilled in the art that modifications may be made to the invention without departing from the concepts disclosed in the forgoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

What is claimed is:
1. A computer implemented method, comprising:
generating, using a processor, a multi-dimensional geometrical object constructed from a plurality of light data obtained from a spectrophotometric measurement of a target coating;
calculating, using the processor, at least one value associated with at least one geometric property of the multi-dimensional geometrical object, wherein at least one of the values associated with the geometric property of the multi-dimensional geometrical object comprises a volume value;
correlating, using the processor, the calculated volume at least one value with a plurality of known volume values to identify at least one pigment effect in the target coating; and,
outputting, using the processor, the at least one pigment effect.

2. The method of claim 1, wherein generating a multi-dimensional geometrical object includes generating a two-dimensional plane.

3. The method of claim 1, wherein generating a multi-dimensional geometrical object includes generating a three-dimensional object.

4. The method of claim 1, wherein generating a multi-dimensional geometrical object includes generating a four-dimensional object.

5. The method of claim 1, wherein generating a multi-dimensional geometrical object includes generating the object based on at least one of an incident light angle, a reflected light angle, a spectral reflectance value, and a planar representation.

6. The method of claim 1, wherein generating a multi-dimensional geometrical object includes generating the object based on spectral reflectance data at a plurality of wavelengths.

7. The method of claim 1, wherein generating a multi-dimensional geometrical object includes generating the object using at least one of spectral reflectance data and colorimetric data.

8. The method of claim 1, wherein generating a multi-dimensional geometrical object includes generating a side of the object based on incident light source data.

9. The method of claim 1, wherein calculating the at least one value includes calculating at least one value for at least one of a plurality of wavelengths.

10. The method of claim 1, wherein the known values are representative of values associated with a plurality of pigment effects.

11. A system, comprising: a database; and a processor in communication with the database and programmed to:
generate a multi-dimensional geometrical object constructed from a plurality of light data obtained from a spectrophotometric measurement of a target coating;
calculate at least one value associated with at least one geometric property of the multi-dimensional geometrical object, wherein at least one of the values associated with the geometric property of the multi-dimensional geometrical object comprises a volume value;
correlate the calculated volume at least one value with a plurality of known volume values to identify at least one pigment effect in the target coating; and output the at least one pigment effect.

12. The system of claim 11, further comprising a spectrophotometer in communication with the processor.

13. The system of claim 11, wherein the processor is further programmed to retrieve the known values from the database.

14. The system of claim 11, further comprising a display device in communication with the processor.

15. An apparatus, comprising:
means for generating a multi-dimensional geometrical object constructed from a plurality of light data obtained from a spectrophotometric measurement of a target coating;
means for calculating at least one value associated with at least one geometric property of the multi-dimensional geometrical object, wherein at least one of the values associated with the geometric property of the multi-dimensional geometrical object comprises a volume value;
means for correlating the calculated volume at least one value with a plurality of known volume values to identify at least one pigment effect in the target coating; and
means for outputting the at least one pigment effect.

16. The apparatus of claim 15, further comprising means for retrieving the known values from a database.

17. A non-transitory computer readable medium including software for causing a processor to:
generate a multi-dimensional geometrical object constructed from a plurality of light data obtained from a spectrophotometric measurement of a target coating;
calculate at least one value associated with at least one geometric property of the multi-dimensional geometrical, wherein at least one of the values associated with the geometric property of the multi-dimensional geometrical object comprises a volume value;
correlate the calculated volume at least one value with a plurality of known volume values to identify at least one pigment effect in the target coating; and
output the at least one pigment effect.

\* \* \* \* \*

UNITED STATES PATENT AND TRADEMARK OFFICE
CERTIFICATE OF CORRECTION

| | | |
|---|---|---|
| PATENT NO. | : 9,816,862 B2 | |
| APPLICATION NO. | : 13/803016 | |
| DATED | : November 14, 2017 | |
| INVENTOR(S) | : Alison M. Norris | |

It is certified that error appears in the above-identified patent and that said Letters Patent is hereby corrected as shown below:

In the Claims

Column 6, Line 38, delete "at least one"
Column 7, Line 16, delete "at least one"
Column 8, Line 7, delete "at least one"
Column 8, Line 26, delete "at least one"

Signed and Sealed this
Thirtieth Day of January, 2018

Joseph Matal
*Performing the Functions and Duties of the
Under Secretary of Commerce for Intellectual Property and
Director of the United States Patent and Trademark Office*